US010151009B2

(12) United States Patent
Pellmann et al.

(10) Patent No.: US 10,151,009 B2
(45) Date of Patent: Dec. 11, 2018

(54) METHOD FOR PRODUCING A MOTOR VEHICLE COMPONENT, AND A BODY COMPONENT (71) Applicant: Benteler Automobiltechnik GmbH, Paderborn (DE)

(72) Inventors: Markus Pellmann, Sassenberg (DE); Martin Pohl, Altenbeken (DE); Martin Schroeter, Paderborn (DE); Stefan Adelbert, Delbrück (DE); Otto Buschsieweke, Paderborn (DE); Christian Handing, Langenberg (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 262 days.

(21) Appl. No.: 14/738,329

(22) Filed: Jun. 12, 2015

(65) Prior Publication Data
US 2016/0017453 A1 Jan. 21, 2016

Related U.S. Application Data (62) Division of application No. 13/069,571, filed on Mar. 23, 2011, now Pat. No. 9,057,114.

(30) Foreign Application Priority Data

Mar. 25, 2010 (DE) .................. 10 2010 012 830

(51) Int. Cl.
*C21D 9/00* (2006.01)
*B62D 21/15* (2006.01)
(Continued)

(52) U.S. Cl.
CPC ............ *C21D 9/0068* (2013.01); *B60R 19/03* (2013.01); *B60R 19/34* (2013.01); *B62D 21/15* (2013.01);
(Continued)

(58) Field of Classification Search
CPC ....... B60R 19/34; B60R 19/02; B62D 29/008; C21D 1/30
(Continued)

(56) References Cited

U.S. PATENT DOCUMENTS 3,240,639 A 3/1966 Lihl
3,352,724 A 11/1967 McNitt et al.
(Continued)

FOREIGN PATENT DOCUMENTS

CN 1071960 A 5/1993
CN 101082101 A 12/2007
(Continued)

OTHER PUBLICATIONS

Carlsson et al.: "Manufacturing of Parts in Ultra High Strength Steel Using Local Heat Treatment", in: Proceedings of ESDA conference in Torino, Italy, Jul. 4-7, 2006.
(Continued)

*Primary Examiner* — Pinel E Romain
(74) *Attorney, Agent, or Firm* — Henry M. Feiereisen LLC (57) ABSTRACT

A method for producing a structural and/or safety-related motor vehicle component having at least one hot-formed and press-hardened part constructed from high-strength steel includes the steps of partially heat-treating a region of the motor vehicle component by heating the region to a heat-up temperature in a temperature range between 500° C. and 900° C.; maintaining the heat-up temperature for a duration of a holding time; and cooling down from the heat-up temperature in one or more phases. A body component constructed as a structural and/or safety-related motor vehicle component from a steel sheet blank that has been hot-formed and press-hardened includes joining flanges and/or coupling locations and/or safety-related parts, wherein the
(Continued)

joining flanges, coupling locations and/or safety-related parts are partially heat-treated in several steps with the disclosed method.

12 Claims, 5 Drawing Sheets

(51) Int. Cl.
| | |
|---|---|
| *B62D 25/14* | (2006.01) |
| *C21D 1/30* | (2006.01) |
| *C21D 9/50* | (2006.01) |
| *B60R 19/03* | (2006.01) |
| *B60R 19/34* | (2006.01) |
| *C21D 8/00* | (2006.01) |
| *C22C 38/00* | (2006.01) |
| *B60R 19/02* | (2006.01) |
| *C21D 1/09* | (2006.01) |
| *C21D 1/673* | (2006.01) |

(52) U.S. Cl.
CPC .............. *B62D 25/14* (2013.01); *C21D 1/30* (2013.01); *C21D 8/005* (2013.01); *C21D 9/50* (2013.01); *C22C 38/00* (2013.01); *B60R 19/02* (2013.01); *C21D 1/09* (2013.01); *C21D 1/673* (2013.01); *C21D 2221/00* (2013.01)

(58) Field of Classification Search
USPC .................................................... 296/187.01
See application file for complete search history.

(56) References Cited

U.S. PATENT DOCUMENTS

| | | | | |
|---|---|---|---|---|
| 3,378,360 A * | 4/1968 | McFarland | ............ | C21D 1/185 |
| | | | | 148/320 |
| 4,840,686 A | 6/1989 | Arnett et al. | | |
| 5,040,399 A | 8/1991 | Knapper et al. | | |
| 5,916,389 A | 6/1999 | Lundström | | |
| 5,972,134 A | 10/1999 | Buschsieweke et al. | | |
| 6,156,134 A | 12/2000 | Shimizu et al. | | |
| 8,118,954 B2 * | 2/2012 | Beenken | ............ | B21D 22/022 |
| | | | | 148/639 |
| 9,409,221 B2 * | 8/2016 | Kobayashi | ............ | B21D 22/02 |
| 2002/0069506 A1 | 6/2002 | Brodt et al. | | |
| 2003/0205910 A1 | 11/2003 | Tjoelker et al. | | |
| 2004/0108306 A1 | 6/2004 | Wiezbowski et al. | | |
| 2006/0130940 A1 | 6/2006 | Kolaritsch et al. | | |
| 2007/0107819 A1 | 5/2007 | Gehringhoff et al. | | |
| 2007/0261769 A1 | 11/2007 | Bodin | | |
| 2008/0196800 A1 | 8/2008 | Beenken et al. | | |
| 2008/0199347 A1 | 8/2008 | Barges et al. | | |
| 2008/0286603 A1 | 11/2008 | Oh et al. | | |
| 2008/0308194 A1 * | 12/2008 | Corquillet | ............ | C21D 1/185 |
| | | | | 148/531 |
| 2009/0020194 A1 | 1/2009 | Minemura et al. | | |
| 2009/0238715 A1 | 9/2009 | Cho et al. | | |
| 2010/0086803 A1 | 4/2010 | Patbers | | |
| 2010/0101296 A1 | 4/2010 | Handing | | |
| 2010/0252151 A1 | 10/2010 | Furrer et al. | | |
| 2010/0300584 A1 * | 12/2010 | Buschsieweke | ....... | C21D 1/673 |
| | | | | 148/530 |
| 2010/0308623 A1 | 12/2010 | Bodin et al. | | |
| 2011/0016719 A1 | 1/2011 | Lee et al. | | |
| 2011/0083774 A1 | 4/2011 | Jin et al. | | |
| 2011/0121587 A1 * | 5/2011 | Handing | ................ | B60R 19/18 |
| | | | | 293/133 |
| 2011/0132502 A1 | 6/2011 | Bian | | |
| 2011/0198820 A1 | 8/2011 | Janzen et al. | | |
| 2011/0232806 A1 | 9/2011 | Pellmann et al. | | |
| 2011/0233946 A1 * | 9/2011 | Pellmann | ................ | B21D 53/88 |
| | | | | 293/132 |
| 2011/0233966 A1 * | 9/2011 | Pellmann | ................ | B62D 25/04 |
| | | | | 296/193.06 |
| 2011/0254315 A1 * | 10/2011 | Pellmann | ............. | B62D 25/025 |
| | | | | 296/191 |
| 2011/0291431 A1 | 12/2011 | Buschsieweke et al. | | |
| 2011/0315281 A1 * | 12/2011 | Charest | .................. | B62D 1/195 |
| | | | | 148/567 |
| 2012/0060982 A1 | 3/2012 | Bohner et al. | | |
| 2012/0103974 A1 | 5/2012 | Buschsieweke et al. | | |
| 2012/0211126 A1 | 8/2012 | Zhang et al. | | |
| 2012/0291928 A1 | 11/2012 | Celotto | | |
| 2014/0193657 A1 * | 7/2014 | Bonds | ..................... | B60J 10/18 |
| | | | | 428/575 |

FOREIGN PATENT DOCUMENTS

| | | | | |
|---|---|---|---|---|
| CN | 101263239 A | | 9/2008 | |
| CN | 203255254 U | * | 10/2013 | |
| DE | 44 22 137 | | 2/1996 | |
| DE | 197 23 655 | | 12/1997 | |
| DE | 197 43 802 A1 | | 3/1999 | |
| DE | 10208216 C1 | | 3/2003 | |
| DE | 102004023579 | | 12/2005 | |
| DE | 102005054847 | | 10/2007 | |
| DE | 102008021492 | | 7/2009 | |
| DE | 102008044523 | | 3/2010 | |
| DE | 102011010174 | * | 8/2012 | ............. B60R 19/03 |
| EP | 1325966 A1 | | 7/2003 | |
| EP | 2 143 621 A1 | | 1/2010 | |
| ES | 2345029 | | 9/2010 | |
| JP | 04-289122 | | 10/1992 | |
| JP | 11-181516 | | 7/1999 | |
| JP | 2003328031 | | 11/2003 | |
| JP | 2006-263711 | | 10/2006 | |
| KR | 2002-0049667 | | 6/2002 | |
| KR | 10-0347582 | | 7/2002 | |
| KR | 2003-0075324 | | 9/2003 | |
| KR | 2004-064386 | | 7/2004 | |
| KR | 10-0848784 | | 7/2008 | |
| KR | 2010-107820 | | 10/2010 | |
| SU | 1330191 | | 8/1987 | |
| WO | WO 2008/018624 | | 2/2008 | |
| WO | WO 2008/048307 | | 4/2008 | |
| WO | WO 2009/135776 | | 11/2009 | |
| WO | WO 2010/076247 | | 7/2010 | |

OTHER PUBLICATIONS

Philipp Heinet al.: "Status and Innovation Trends in Hot Stamping of USIBOR 1500 P", in: steel research int., No. 2, 2008.
George E Totten (edit): "Steel Heat Treatment Handbook, Matallurgy and Technologies", Second edition, Taylor and Francis Group LLC, Boca Raton, FL, 2007.
Malcolm Blair et al. (edit.): "Steel Castings Handbook, Sixth Edition, Chapter 24: Hardenability and Heat Treatment", 1995.
R. George et al.: "Localized Die Temperature Control for Tailored Properties in Jot Forming of Boron Steels—Numerical Study", in: International Deep Drawing Research Group, Int. Conference, Jun. 1-3, 2009, USA.
Berglund et al.: "Hot Stamped Components With "Soft Zones" for Improved Crashworthiness—Simulation and Validation of Product Performance", in: International Deep Drawing Research Group, Int. Conference, Jun. 16-18, 2008, Sweden.
M. Heyde et al,: "Local Heat Treatment of Ultra-High-Strength Steels—an Opportunity to Extend the Range of Car Body Components", in: 50th Anniversary Conference: Tools and Technologies for the Processing of Ultra High Strength Steels, Conference Proceedings, May 31-Jun. 2, 2010, Graz, Austria.
A. Naganathan et al.: "Sheet Metal Forming—Processes and Applications, Chapter 7: Hot Stamping", ASM International, 2012.

* cited by examiner

METHOD FOR PRODUCING A MOTOR VEHICLE COMPONENT, AND A BODY COMPONENT

CROSS-REFERENCES TO RELATED APPLICATIONS

This application is a divisional of prior filed copending U.S. application Ser. No. 13/069,571, filed Mar. 23, 2011, the priority of which is hereby claimed under 35 U.S.C. § 120, and which claims the priority of German Patent Application, Serial No. 10 2010 012 830.9-24, filed Mar. 25, 2010, pursuant to 35 U.S.C. 119(a)-(d).

The contents of U.S. application Ser. No. 13/069,571 and German Patent Application, Serial No. 10 2010 012 830.9-24 are incorporated herein by reference in their entireties as if fully set forth herein.

BACKGROUND OF THE INVENTION

The present invention relates to a method for producing a motor vehicle component having at least one hot-formed and press-hardened component made of high-strength sheet steel. The present invention also relates to a body component, in particular a body component produced with the method.

It would be desirable and advantageous to provide an improved method for producing a motor vehicle component at low cost in industrial-scale production which obviates prior art shortcomings, while maintaining the reliability of the component in operation. It would be desirable and advantageous to provide a body component produced with this method.

SUMMARY OF THE INVENTION

According to one aspect of the invention, a method for producing a motor vehicle component with at least one hot-formed and press-hardened component constructed from high-strength steel, wherein the motor vehicle component is used as structural component and/or safety-related component in a motor vehicle, includes the steps of partially heat-treating a region of the motor vehicle component by heating the region to a heat-up temperature in a temperature range between 500° C. and 900° C., maintaining the heat-up temperature for a duration of a holding time; and cooling down from the heat-up temperature in at least one phase.

In accordance with the present invention, the material properties desired for the motor vehicle component can advantageously be designed and produced with a reliable process. The component produced by hot-forming and press-hardening has a hard and brittle structure. The material structure of the component is changed in the heat-treated regions by the partial heat treatment below the austenitic temperature with the method of the invention, thereby producing a material structure with enhanced ductility. Heat-treating a particular area of a component, such as the cross member, will hereinafter also be referred to a "partially" heat-treating or "partial" heat treatment of a component or an area of a component. According to the invention, heat-up begins at a start temperature which the component assumes after the press-hardening process. For example, this can be the ambient temperature. However, the start temperature of the heat-up is always lower than the martensitic start temperature (MS), suitably less than 200° C.

According to another advantageous feature of the present invention, stress in the heat-treated regions may be reduced by selecting the temperature range for heat-up or for holding the heat-up temperature between 500° C. and 900° C., for example at joining flanges or in the marginal locations of openings, which are subjected to the heat treatment according to the invention.

Taking as an example a motor vehicle component employed as a structural component or a safety-related component in an integral body-frame body, the heat-treated region has a particularly advantageous effect on the crash property of the body in applications of the motor vehicle component. For example, if a region embodied as a joining flange is heat-treated with the method of the invention, then this joining flange does not tend to tear or strip or form cracks in the event of an accident, so that the surrounding structural and safety-related components stay together. This is particularly advantageous for the protection of occupants in a passenger compartment. The term joining flange in the context of the present invention is intended to indicate a flange region provided for attaching another component or part of another component. The connection can hereby be produced by gluing, riveting, welding, brazing or similar joining processes.

Another advantage is attained in regions which experience an intended deformation in the event of an accident. This deformation may be provided to introduce into the body energy to be dissipated, thereby once more enhancing the crash protection for vehicle occupants. Another application is, for example, the intentional deformation of individual regions to facilitate repairs after an accident.

In the event of a crash, the regions that were heat-treated with the method of the invention can be deformed so as to enable the intentional formation of wrinkles and hence intentional dissipation of energy. The heat-treated regions also have a lesser tendency for crack formation, because the structure is more ductile in comparison to the hot-formed and press-hardened, hard and brittle structure.

The method of the invention provides a reliable process for obtaining the desired material properties in industrial-scale production. Any variation in the manufacturing tolerances during production can thus be largely eliminated, so that when employing, for example, a body with specific crash points designed by a CAD-computation, a high manufacturing precision can be ensured by using motor vehicle components produced with the method of the invention.

According to another advantageous feature of the present invention, the partial heat treatment may be performed on joining flanges of the component. The joining flanges then advantageously assume ductile material properties. In a material connection by thermal joining, the structure is altered in the heat treatment zone of the joining method. A ductile section of the component is here particularly advantageous for the welding process and for the material structures produced after the welding process and the thermal treatment zone. These material structures are also transformed into a ductile material structure region by a partial heat treatment performed with the method of the invention. This again advantageously enhances the durability of the connected weld seams in the event of an accident of the motor vehicle. The term weld seam in the context of the invention refers to all weld seams produced by thermal joining. For example, these can be continuous longitudinal weld seams, but also spot welds or discontinuous weld seams.

According to another advantageous feature of the present invention, the partial heat treatment may be performed on openings of the component. These openings may be introduced in the component to optimize its weight or for passing through other components, for example a gear shift lever or a wiring harness and the like. In particular, cracks which may extend over the entire component in the region of the openings and also in the end region of openings may develop in the event of an accident. By reducing the surface stress, a ductile material structure is produced in this region. This counters the formation of cracks and impedes unintentional deformation of the component.

Moreover, stress from reverse bending stresses, which may be introduced into the body by, for example, body torsion or other driving parameters, for example engine vibrations and the like, can thus be particularly advantageously affected. A particular positive effect can be attained by reducing the surface stress in the end region of openings by partial heat treatment with the method of the invention, thereby improving the durability of a motor vehicle body.

According to another advantageous feature of the present invention, the vehicle component may be constructed by coupling at least two components, wherein the heat treatment is performed at the coupling locations, The at least two components may be at least two hot-formed and press-hardened components. However, alternatively only one hot-formed and press-hardened component may be used which is coupled with a second component produced by a conventional manufacturing process or by a sheet metal machining process. Advantageously, the hot-formed and press-hardened component can be provided with the same positive effects according to the invention that were already described above.

Treatment of the coupling locations with a method according to the invention may also advantageously affect their load carrying capability and durability. In the coupling region produced by thermal joining, a heat treatment zone is produced in a weld seam, which again is accompanied by a structural change. The implemented coupling process, for example inert gas welding, laser welding, spot welding, roll seam welding and the like, produce different material properties which sometimes also have undesirable side effects. For economic reasons in industrial-scale production, however, the advantages of the respective employed welding process are greater than their disadvantages. However, these disadvantages can be cost-effectively eliminated with the method of the invention even in industrial-scale production.

The heat treatment of the weld seams is particularly advantageous for their durability, corrosion resistance and deformability.

According to another advantageous feature of the present invention, heat-up may be performed over a time period of up to 30 seconds, suitably of up to 20 seconds. Currently preferred is a time period of up to 10 seconds, or of up to 5 seconds. Heat-up may take place according to the method of the invention in a progressive, linear or diminishing temperature increase over time. A short heat-up phase for reaching the heat-up temperature, in combination with a subsequent holding phase where the heat-up temperature is held constant during a holding time, is particularly advantageous for the process reliability of the partial heat treatment.

According to another advantageous feature of the present invention, the holding time may extend over a time period of up to 30 seconds. Suitably, the holding time extends over a time period of up to 20 seconds. Currently preferred is a holding time of up to 10 seconds, or of up to 5 seconds. By the intentional control of the material structure transformation at a constant temperature, only affected by the duration of the holding time, the hardening and tempering process within the context of the invention can be particularly reliably performed. More particularly, the attained heat-up temperature is held substantially constant during the holding time. An additional temperature increase or temperature decrease during the holding time, with a temperature difference range relative to the heat-up temperature of maximally 100° C., is also feasible within the context of the invention.

According to another advantageous feature of the present invention, the short time intervals for the heat-up and holding time may largely prevent heat transfer by thermal conduction. In addition, the method of the invention may advantageously also be integrated with heat forming steps and additional subsequent manufacturing steps into the cycle time of existing production processes. The cycle times can thereby be located in a time window between 5 seconds and 30 seconds, suitably between 10 seconds and 15 seconds.

The method steps of heat-up and holding can be performed in a single apparatus which can also be used to hot-form and press-harden the component. However, the components may also be moved to a separate apparatus after hot-forming and press-hardening, where heat-up and holding of the heat-up temperature are performed. Heat-up and holding the temperature can be accomplished, for example, with inductive heating or similar heating methods, which can be integrated in the production process depending on the particular application.

According to another advantageous feature of the present invention, cooldown is performed in at least two phases. In the context of the invention, the two cooldown phases can have a substantially identical duration. Particularly preferred, the first cooldown phase has a longer duration than the second cooldown phase. The cooldown phases can also be performed in a single apparatus or in the apparatus for heat treatment or in a separate cooldown vessel. It is also feasible within the context of the invention to perform the at least two different cooldown phases in two separate cooldown vessels.

Because the cooldown process of the thermal treatment according to the invention has several phases, the desired stage for the structural transformation and hence the desired material property in the partially heat-treated regions can be attained with high process reliability, cost-effectively and with high accuracy. It is also possible with the multi-phase cooldown to integrate the cooldown process in the ongoing production of a produced component so that it can be adjusted individually over a wide range to the cycle times of previous and subsequent processing steps, without adversely affecting the quality of the attainable structural transformations.

According to another advantageous feature of the present invention, the second cooldown phase may be performed over a time interval of up to 120 seconds, suitably of up to 60 seconds. In other advantageous embodiment, the motor vehicle component may be cooled in the first cooldown phase to a temperature between 200° C. and 900° C., suitably between 300° C. and 800° C. Currently preferred is a temperature between 500° C. and 700° C.

In a second phase, the motor vehicle component is cooled to a target temperature. The target temperature within the context of the invention is below 200° C. There is no longer a thermally-induced component distortion at a component temperature of 200° C., which could otherwise have negative implications for the production reliability of the method. It may also be envisioned within the context of the invention that the component is cooled down to room temperature. The cooldown curves of the temperature difference and the cooldown curve during the cooldown time, respectively, according to the invention can then again be progressive, linear, but also diminishing. This advantageously essentially eliminates further component distortion after reaching the first cooldown temperature.

According to another advantageous feature of the method of the present invention, heating to the heat-up temperature takes place by way of induction and/or infrared heating. Infrared heating in the context of the invention refers to, for example, infrared radiators producing heat with lamps. In this way, very small local regions with a clearly defined boundary region can advantageously be heat-treated within the context of the overall method. The transition zone between the hot-formed and press-hardened region that was not heat-treated and the partially heat-treated region is according to the method of the invention advantageously less than 100 mm, suitably less than 50 mm. Currently preferred is a transition zone between 1 and 20 mm. In this way, small regions with sharp boundaries can be intentionally locally heat-treated.

According to another advantageous feature of the present invention, a body component is constructed as a structural component and/or as a safety-related component for a motor vehicle by hot-forming and press-hardening a steel sheet blank. The body component includes joining flanges and/or coupling locations and/or safety-related elements which are partially heat-treated by heating a region of the joining flanges, coupling locations or safety-related elements to a heat-up temperature in a temperature range between 500° C. and 900° C., maintaining the heat-up temperature for a duration of a holding time, and cooling down from the heat-up temperature in at least one phase. Other crash-relevant component regions may also be partially heat-treated with the aforementioned steps.

The body component produced in this manner can advantageously deform in the event of an accident in a desired manner. This deformation behavior defined specifically for the component can be implemented, for example, through the wrinkle formation. In addition, the joining flanges and/or coupling locations become rather ductile with the heat treatment according to the invention, so that they have a tendency to deform rather than a tendency to tear in the event of an accident.

A body component in the context of the invention refers to an A-column, a B-column, a C-column, a D-column, a bumper, a crash box, a longitudinal front beam, a longitudinal rear beam, a tunnel, for example in form of a transmission tunnel, a rocker panel, a cross beam, a seat cross beam, a heel plate, a roof support beam, a floor panel, a sidewall, a vehicle door, a trunk lid, an engine lid, a roof area or an instrument support with different added components. Additional sheet steel components of a motor vehicle may also be regarded as a body component.

A crash-relevant component region is, for example, an attachment region of an A-, a B- or a C-column, or a coupling region of a rocker panel with a cross beam on a longitudinal beam. Overall, crash-relevant component regions within the context of the invention are those component regions which are subjected to particularly high stress in a vehicle crash. These are, for example, attachment regions where two components are coupled together, or transition zones, for example the radii of a door opening in a vehicle body, or similar regions which must adhere to stringent requirements with respect to a deformation and durability in the event of a vehicle crash.

Regions which have a defined deformation in the event of a vehicle crash can be created in a side rail heat-treated with the method of the invention. This deformation may occur, for example, in the form of wrinkling or folding.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1A:
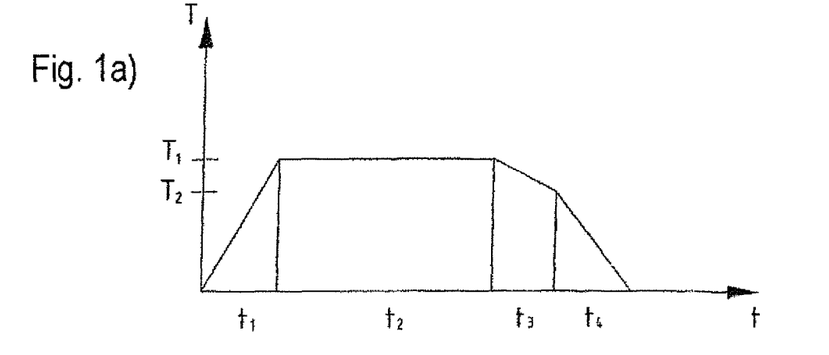
FIGS. 1a), 1b), 1c) show different temperature curves of the individual steps of the heat treatment over time.

Turning now to the drawing, and in particular to FIG. 1a, there is shown a temperature curve as a function of time with the time intervals heat-up time (t1), holding time (t2), cooldown time first phase (t3) and cooldown time second phase (t4) according to the invention. In addition, the heat-up temperature (T1) and a first cooldown temperature (T2) are shown on the temperature axis.

Starting with a hot-formed and press-hardened motor vehicle component which is essentially at a temperature below 200° C., this vehicle component is heated during the heat-up time to the heat-up temperature (T1). With a starting temperature of below 200° C., but still above room temperature, the residual thermal energy from the hot-forming and press-hardening process is used for the partial heat treatment within the context of the invention.

Heat-up includes a linear temperature increase as a function of time. After the heat-up time (t1), the heat-up temperature (T1) is maintained during a holding time (t2). The heat-up temperature (T1) is held essentially constant during the entire holding time (t2). Temperature variations in form of a temperature increase or a temperature decrease are not illustrated, but may occur within the context of the invention during the holding time (t2) to affect the desired changes in the material structure, but also for cost reasons of the production process.

At the end of the holding time (t2), a first cooldown to a cooldown temperature (T2) occurs. The temperature hereby decreases linearly during the cooldown time of the first phase (t3) to the cooldown temperature (T2). The cooldown temperature (T2) may be in a range between 100° C. and a heat-up temperature (T1).

In a subsequent second cooldown phase, an additional linear temperature decrease takes place during the cooldown time of the second phase (t4). The temperature can hereby essentially be lowered to room temperature or to a desired (unillustrated) target temperature. It would also be feasible within the context of the invention to include additional cooldown phases, which are not illustrated.

Figure 1B:
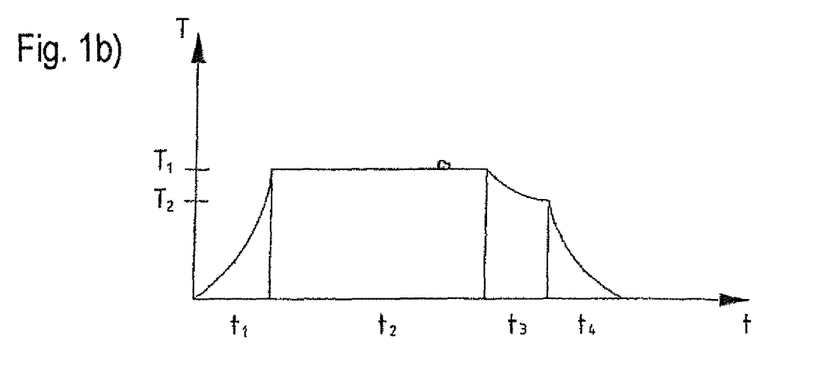

FIG. 1b shows a substantially similar temporal arrangement of the heat treatment, with the difference to FIG. 1a that the temperature increases progressively during the heat-up time (t1), whereas the cooldown during the first and second phase have each a decreasing temperature over time (t3, t4).

Figure 1C:
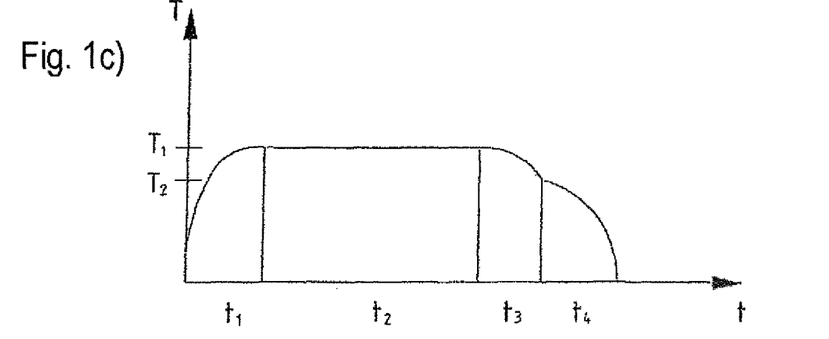

FIG. 1c shows, in addition to FIGS. 1a and 1b, that the temperature curve has a diminishing temperature increase during the heat-up time (t1) and the functional dependence of the temperature decrease over time (t3, t4) is progressive during each of the various cooldown phases.

In the context of the invention, it would also be feasible to combine the temperature dependence over time in mixed forms, such as progressive, linear and diminishing, during the holding time (t2).

Figure 2:
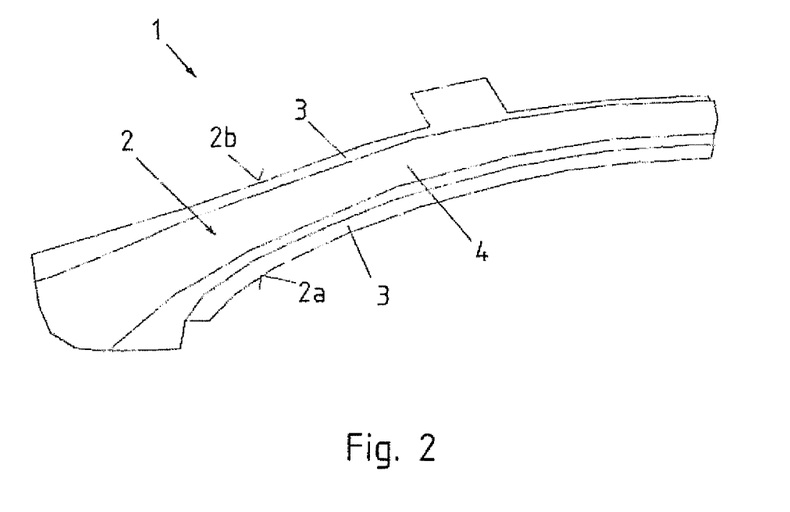
FIG. 2 shows a perspective view of an A-column.

FIG. 2 shows a motor vehicle component 1 in form of an A-column 2 of an (unillustrated) motor vehicle body. Arranged on the respective sides 2a, 2b of the A-column 2 are joining flanges 3 which are heat-treated with the method of the invention. The A-column 2 then has high strength and hardness in its center profile sections 4 which guarantees protection of the passenger compartment in the event of a crash, whereas the joining flanges 3 have a rather ductile material characteristic relative to the center profile section, so that components attached to the joining flanges 3 (which are not illustrated here) remain connected with the A-column 2, without producing tears at the connecting locations characterized by the joining flanges 3.

Figure 3:
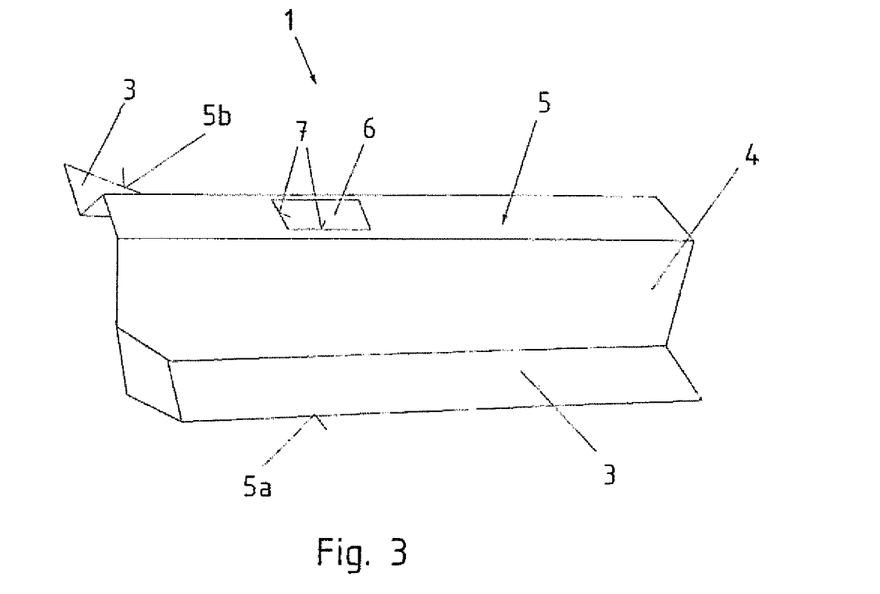
FIG. 3 shows a perspective view of a frame tunnel.

FIG. 3 shows a motor vehicle component 1 in form of a transmission tunnel 5. The transmission tunnel 5 has an opening 6, as well as joining flanges 3 disposed on both sides 5a, 5b, and a center profile segment 4. The end regions 7 of the opening 6 and the joining flanges 3 can here also be heat-treated with the method of the invention. In the event of the vehicle crash, the formation of tears, which would otherwise adversely affects the deformation characteristic of the motor vehicle component 1, here in form of the transmission tunnel 5, is intentionally prevented with the heat treatment of the end regions 7 of the opening 6.

Figure 4:
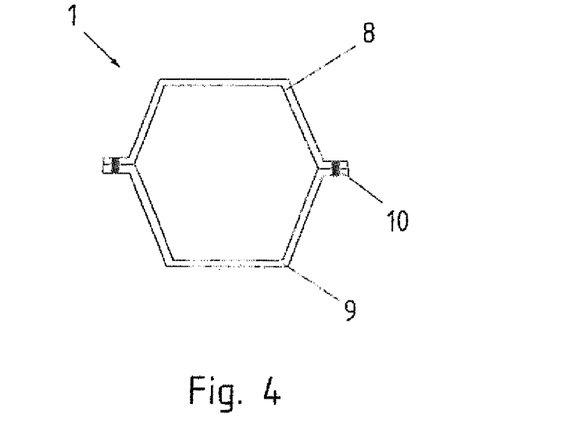
FIG. 4 shows a motor vehicle component consisting of two coupled components.

FIG. 4 shows a motor vehicle component 1 constructed of two coupled components 8, 9. In this illustrated embodiment, an upper (in relation to the image plane) component 8, a hot-formed and press-hardened component and a lower (in relation to the image plane) component 9 form a component produced with conventional forming methods. The two components 8, 9 are coupled together at coupling locations 10. The coupling locations 10 were heat-treated following the coupling process using a method according to the invention.

Figure 5:
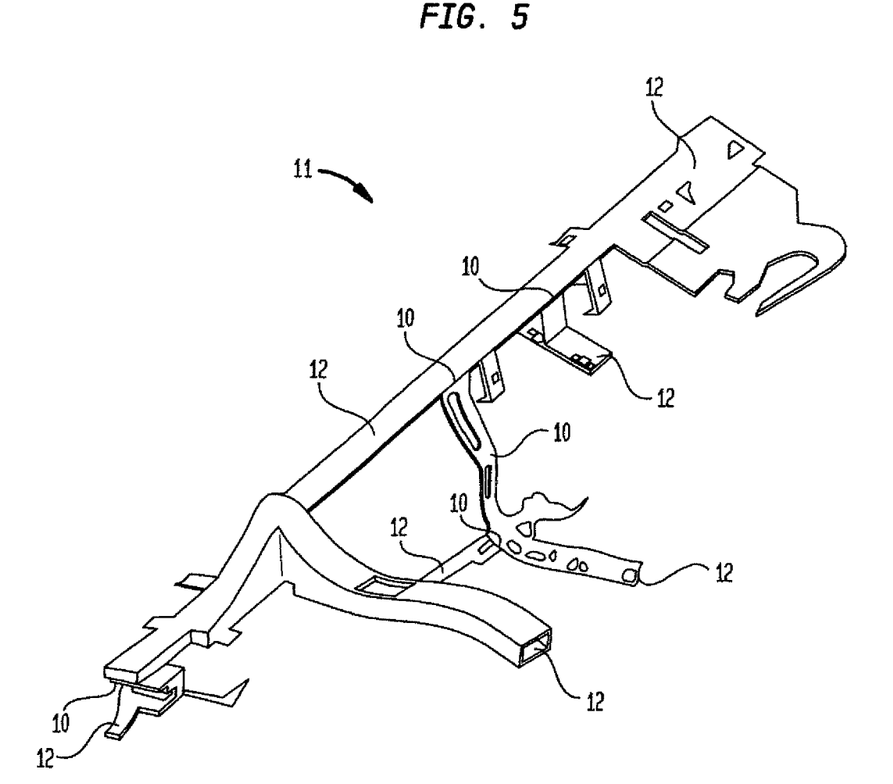
FIG. 5 shows an instrument carrier made of several components.

FIG. 5 shows an instrument carrier 11 constructed of several individual components 12. The individual components 12 are here coupled with each other at coupling locations 10.

Figure 6:
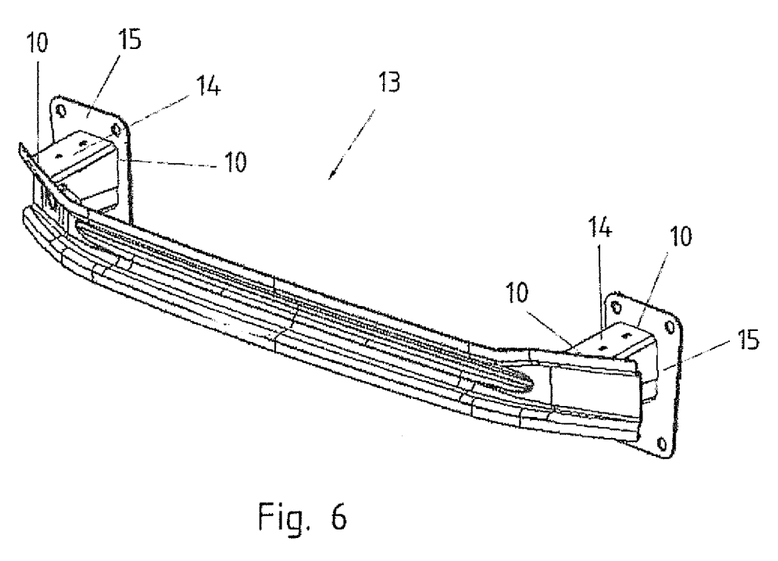
FIG. 6 shows a bumper with various add-on components.

FIG. 6 shows a bumper 13 with two crash boxes 14 and mounting plates 15 coupled to the crash boxes. The bumper 13 is coupled to the crash boxes 14 at coupling locations 10 through thermal joining.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A body component constructed as a structural component or as a safety-related component for a motor vehicle, said body component produced by hot-forming and press-hardening of a steel sheet blank, said body component having a first region which has been reheated to a heat-up temperature in a temperature range between 500° C. and 900° C., maintained at the heat-up temperature for a duration of a holding time, and cooled down from the heat-up temperature in at least one phase, said first region having a material structure of a ductility which is greater than a material structure of a hot-formed and press-hardened second region of the body component, said body component being produced by heat after treatment executed after the press-hardening, wherein a transition zone between the first region and the second region is less than 50 mm.

2. The body component of claim 1, further comprising a joining flange or a coupling location or a safety-related part or opening, said first region being part of the joining flange, coupling location, safety-related part or opening.

3. The body component of claim 1, for coupling with such body component at a coupling location, said first region being the coupling location.

4. The body component of claim 3, wherein the further body component is hot formed and press hardened and at least partially heat treated in the coupling location.

5. The body component of claim 3, wherein the further body component is produced by a sheet metal machining process.

6. The body component of claim 3, wherein the body component and the further body component are coupled in the coupling location by thermal joining, thereby producing a heat treatment zone which is heat treated.

7. The body component of claim 1, wherein the transition zone between the first region and the second region is less than 100 mm.

8. The body component of claim 1, wherein the body component is a part selected from the group consisting of an A-column, a B-column, a C-column, a D-column, a bumper, a crash box, a longitudinal front beam, a longitudinal rear beam, a tunnel, in form of a transmission tunnel, a rocker panel, a cross beam, a seat cross beam, a heel plate, a roof support beam, a floor panel, a sidewall, a vehicle door, a trunk lid, an engine lid, a roof area, and an instrument support with different added components.

9. The body component of claim 3, wherein the body component forms a bumper having a crash box formed by the further body component and coupled to the bumper at the coupling location by thermal joining, said first region being the coupling location.

10. The body component of claim 1, wherein the body component has an opening, said first region reducing a surface stress in an area of the opening.

11. The body component of claim 1, wherein the first region has a defined deformation in an event of a vehicle crash.

12. The body component of claim 11, wherein the defined deformation is wrinkling or folding.

\* \* \* \* \*